(No Model.)
D. McGLADERY.
REIN HOLDER.
No. 279,411.  Patented June 12, 1883.
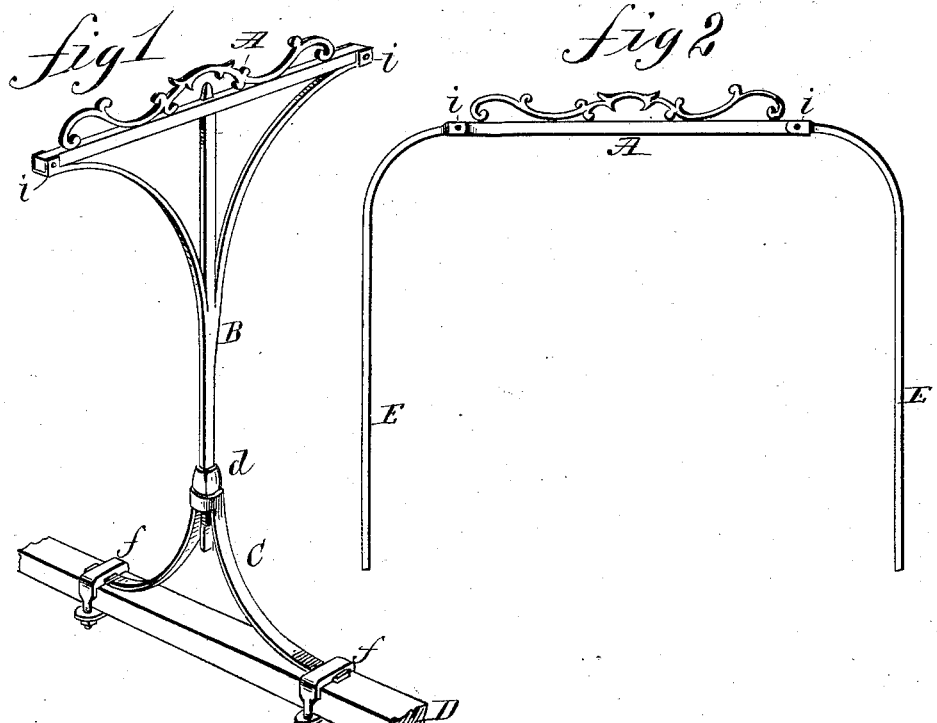
WITNESSES:
J. D. Garfield
C. Sedgwick
INVENTOR:
D. McGladery
BY Munn & Co.
ATTORNEYS.

UNITED STATES PATENT OFFICE.

DAVID McGLADERY, OF HAVILANDSVILLE, KENTUCKY.

REIN-HOLDER.

SPECIFICATION forming part of Letters Patent No. 279,411, dated June 12, 1883.

Application filed March 10, 1883. (No model.)

*To all whom it may concern:*

Be it known that I, DAVID McGLADERY, of Havilandsville, Harrison county, Kentucky, have invented a new and Improved Rein-Holder, of which the following is a full, clear, and exact description.

This invention consists of a rein holder or support to prevent the horse from getting his tail over the reins, which device is adapted to be attached to single and double or one and two horse vehicles.

Reference is to be had to the accompanying drawings, forming part of this specification, in which similar letters of reference indicate corresponding parts in all the figures.

Figure 1 is a perspective view of my new and improved rein-holder arranged to be attached to the tongue of a double vehicle. Fig. 2 is a front elevation, showing the holder arranged to be attached to the thills of a single vehicle; and Fig. 3 shows a modification of my invention.

A is an ornamental cross-piece that holds or supports the reins in an elevated position. In the form of holder shown in Fig. 1 this cross-piece is attached to the center piece, B, which is held, by means of the clamp-screw $d$, in the support C, which support is held upon the tongue D of the double vehicle by means of the U-irons $ff$. The cross-piece A is made detachable from the center piece, B, by simply removing the pins or small bolts $i\ i$, and when so detached the side supports, E E, may be attached to its ends, as shown in Fig. 2, by which side supports the device may be attached to the thills of a single vehicle.

Instead of using separate detachable supports for the rein-holder to adapt it for single and double vehicles, I may use the curved supports E' E' shown in Fig. 3, which are pivoted at their upper ends to the ends of the cross-piece A, so that they are adapted to be swung out to the position shown in dotted lines for a single vehicle, or turned toward each other to occupy a central position, as shown in full lines, in which position they will be held together by the collar $f$, and held upon the tongue in the supports C by the clamp-screw $d$ in the same manner that the center piece, B, is held.

Thus constructed it will be seen that the device is cheap and efficient for its purpose, and is adapted for single and double vehicles, and for mowing-machines, reapers, and other agricultural machines. Instead of making the cross-piece A with an ornament over which the reins pass, rings or other holding devices through which the reins may be passed may be attached to the cross-piece and still involve the principle of my invention.

Having thus described my invention, I claim as new and desire to secure by Letters Patent—

A rein-holder having transverse holes near its ends, in combination with the pins $i\ i$ and a support from the pole or shaft of vehicle, provided with ears adapted to embrace said ends and holes adapted to register with those in the ends of the holder, as shown, whereby it may be used either on a one or two horse vehicle, as described.

DAVID McGLADERY.

Witnesses:
LUCIUS DESHA, Jr.,
JOHN W. HALL.